No. 677,287. Patented June 25, 1901.
A. J. SUTTON.
COMBINED LISTED CORN CULTIVATOR AND WEEDER.
(Application filed Mar. 13, 1901.)

(No Model.)

Witnesses
C. H. Walker.
E. M. Shuster.

Inventor
A. J. Sutton,
By
Attorney.

UNITED STATES PATENT OFFICE.

ANDREW J. SUTTON, OF OTTUMWA, KANSAS.

COMBINED LISTED-CORN CULTIVATOR AND WEEDER.

SPECIFICATION forming part of Letters Patent No. 677,287, dated June 25, 1901.

Application filed March 13, 1901. Serial No. 51,008. (No model.)

*To all whom it may concern:*

Be it known that I, ANDREW J. SUTTON, a citizen of the United States, residing at Ottumwa, in the county of Coffee and State of Kansas, have invented certain new and useful Improvements in a Combined Listed-Corn Cultivator and Weeder; and I do hereby declare the following to be a full, clear, and exact description of the invention, such as will enable others skilled in the art to which it appertains to make and use the same.

This invention relates to an improvement in corn-cultivators, especially of that type designed for use in the cultivation of listed corn.

To this end the invention contemplates a simple and effective machine of this character comprising means for not only thoroughly cultivating the corn without any danger of covering the same up by dirt and clods, but also for paring off the weeds.

As is well known, listed corn when planted is in a trench with well-defined ridges between the rows, which are thrown up by the ordinary double-plow lister, and for that reason it is difficult to cultivate the corn when small on account of the liability of covering the same up by dirt and clods. The present invention provides a construction which obviates this possibility, while also paring off the weeds and cultivating the corn in such a manner as to allow just enough fine dirt to fall into the trench about the corn so as to leave the same well hoed. Also the shovels are so arranged in connection with the other parts of the machine as to tend to level the ridges, so that when the machine passes over nothing is left to interfere with the corn.

With these and many other objects in view, which will more readily appear as the nature of the invention is better understood, the same consists in the novel construction, combination, and arrangement of parts hereinafter more fully described, illustrated, and claimed.

The essential features of the invention are necessarily susceptible to some modification without departing from the spirit or scope thereof, but the preferred embodiment of the improvements is shown in the accompanying drawings, in which—

Figure 1:
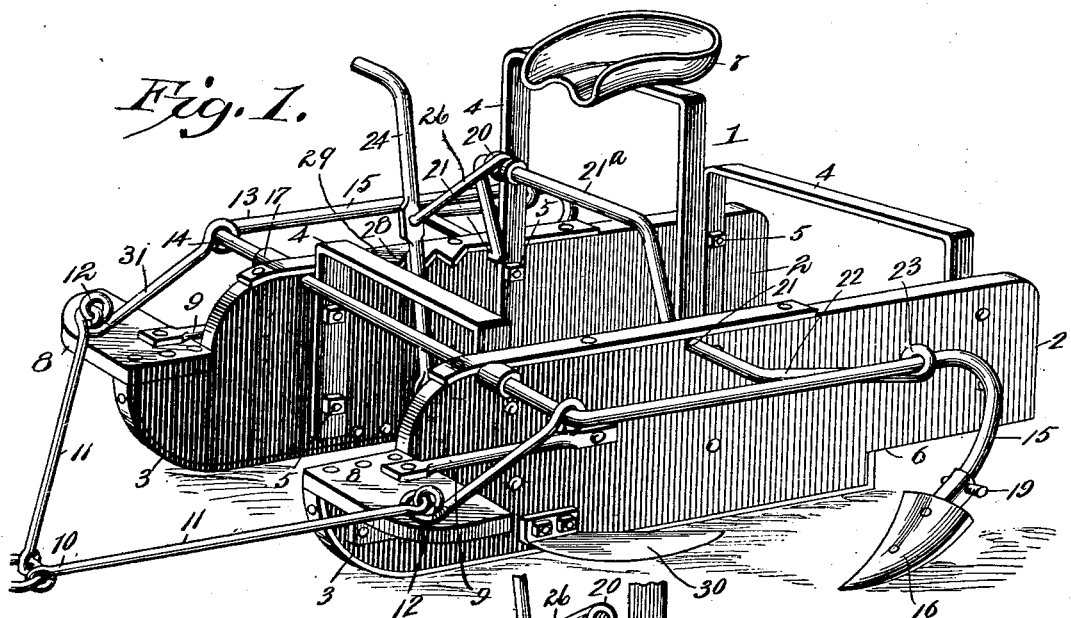
Figure 2:
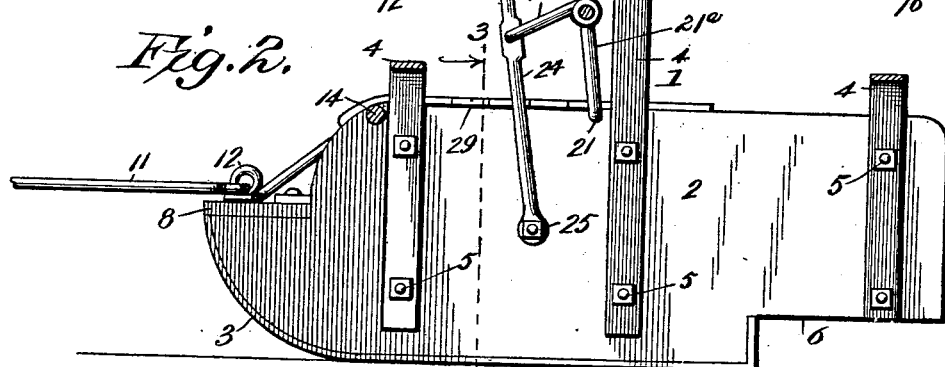
Figures 3, 4:
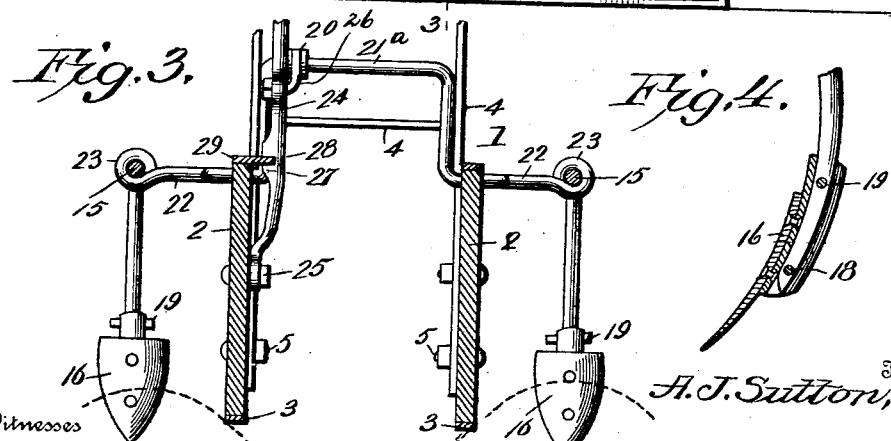

Figure 1 is a perspective view of a listed-corn cultivator and weeder constructed in accordance with the present invention. Fig. 2 is a vertical longitudinal sectional view thereof. Fig. 3 is a cross-sectional view thereof on the line 3 3 of Fig. 2. Fig. 4 is a detail sectional view of one of the shovel connections.

Like numerals of reference designate corresponding parts in the several figures of the drawings.

In carrying out the invention the main body of the machine essentially comprises a runner-frame 1, consisting of a pair of parallel runners 2 of duplicate formation and spaced a sufficient distance apart to straddle the corn-row and permit of the cultivation of the soil at both sides of the row, while at the same time protecting the corn from being covered up by dirt and clods. As is usual in this type of machines, the upright parallel runners 2 are constructed of wood and are preferably provided at their lower edges with the metallic protective wear-shoes 3, which serve to protect the runners from undue wear, while at the same time permitting the same to be freely drawn over the ground. In addition to the parallel runners 2 the runner-frame 1 includes a plurality of arched cross-braces 4, bridging the space between the runners at the top thereof, and rigidly fastened at their opposite ends, as at 5, to the inner sides of the runners, thus providing a structure in which the runners are thoroughly braced and are held perfectly rigid in their spaced relation.

The present invention also contemplates providing the runners 2 at the bottom corners of their heel ends with cut-away portions 6, which serve to lighten the draft by reason of obviating the drag which occurs at the rear ends of the runners; also, the said cut-away portions 6 necessarily lighten the draft on account of lessening the extent of runner-surface on the ground.

One of the arched cross-braces 4, preferably the center one, is considerably higher than the other braces located, respectively, at the front and rear end portions of the runner-frame and projects a considerable distance above the runners to constitute a support for the driver's seat 7, and at the front ends of the runners 2 the latter are provided with horizontally-disposed outwardly-projecting or laterally-offset foot-rests 8, which rests are preferably braced to the outside of the runners through the medium of exterior braces 9 and afford offset points of connection for the draft appliance 10. The draft appliance 10 essentially consists of the forwardly-convergent draft-rods 11, suitably connected at their front ends and pivotally connected by a pivotal connection 12 at their rear ends, respectively, with the opposite offset rests 8 for the purpose hereinafter explained. At this point it will be noted that the rests 8 not only serve as foot-rests, but also as points of connection for the draft appliance, as well as acting as guards which crush clods and prevent the overturning of the machine.

The runner-frame, consisting of the runners 2, constitutes a carrier and support for a vertically-swinging shovel-carrying frame 13. This frame essentially consists of a transverse rock-shaft 14 and a pair of opposite rearwardly-extending beams 15, carrying the cultivator-shovels 16, working, respectively, at the outside of the opposite runners. The transverse rock-shaft 14 serves as a common connection or coupling between the opposite shovel-carrying beams 15 and is journaled in suitable bearings 17, provided upon the opposite runners and top edges thereof, thus providing a journaling of the rock-shaft transversely of the runner-frame at the top thereof. Any suitable type of shovel-carrying-beams may be utilized in connection with the rock-shaft 14 and may either be integrally formed with such rock-shaft or separately united thereto without affecting the spirit or scope of the invention, and although any kind of cultivator-shovel may be fitted to the standards of the beams 15 a preferable shovel attachment is shown in the drawings and consists in mounting the shovels 16 upon the standards by a pivot 18 and holding the same in working position by the ordinary breakpin connection 19 or equivalent device.

While the vertical adjustment of the shovel-carrying frame may be accomplished by different means, a preferable construction is shown in the drawings and resides in the employment of an oscillatory adjusting device 20, formed of a shaft journaled in suitable bearings 21 at the top edge of opposite runners and provided with an intermediate crank or crank-bend 21ª between the planes of the runners and at its opposite extremities with the angled crank-arms 22, provided at their ends with the slide-eyes 23, loosely receiving the shovel-carrying beams 15. The movement of the adjusting device or shaft 21 is effected by means of an operator's lever 24, pivotally supported at its lower end, as at 25, upon the inner side of one of the runners in front of the driver's seat and having a pivotal link connection 26 with the intermediate crank or crank-bend 21 of the adjusting device or shaft 20. The said lever 24 is provided intermediate its ends with a catch lip or flange 27, adapted to engage with the teeth 28 of a locking-plate 29, secured to the adjacent runner, and providing means in connection with the lever 24 for rigidly holding the cultivating-shovels down to their work, as well as for holding them in an elevated position out of the ground when the machine is not working. It is obvious that an oscillation of the shaft 20 in either direction will necessarily effect either the up or down movement of the shovel-carrying frame.

In using the machine the same is preferably fitted with weeding knives or blades 30, secured to the outer sides of the opposite runners in advance of the cultivating-shovels and upwardly and rearwardly inclined with reference to the line of movement of the machine, so as to occupy such a plane as to effectively pare off the weeds from the sides of each ridge. The machine of course can be operated with or without the said knives; but the same are preferably employed, and necessarily so when the ridges have a growth of weeds at the sides of the corn-rows.

It should be noted that the cultivating-shovels 16 are held in spaced relation to the opposite sides of the runners and in line with the connection 12 of the draft appliance 10, so that the draft will come directly on the shovels.

From the foregoing it is thought that the construction, operation, and many advantages of the herein-described machine will be readily apparent without further description, and it will be understood that changes in the form, proportion, and minor details of construction may be resorted to without departing from the spirit or scope of the invention—such, for instance, as the changes already indicated and such details as the bearing-braces 31, reaching from the foot-rests 8 to the end portions of the rock-shaft 14.

Having thus described the invention, what I claim as new, and desire to secure by Letters Patent, is—

1. In a machine of the class described, the runner-frame having opposite runners, a vertically-swinging shovel-carrying frame having a transverse rock-shaft and oppositely-located shovel-beams, and a suitably-actuated oscillatory adjusting-shaft mounted upon the runner-frame and provided with terminal arms having loose engagement with said beams.

2. In a machine of the class described, a runner-frame provided at the front ends of its runners with outwardly-projecting rests, a shovel-carrying frame having shovel-beams at the outer sides of the runners, and a transverse rock-shaft connecting said beams, a draft appliance connected with said rests in line with the shovels, and braces extending from the rock-shaft to the point of connection of the draft appliance with said rests.

3. In a machine of the class described, the runner-frame comprising the opposite runners, a vertically-swinging shovel-carrying frame comprising a transverse rock-shaft journaled upon the runners, and shovel-beams located at the outer sides of the runners, an oscillatory adjusting-shaft also journaled upon the runners and provided with an intermediate crank, and with terminal crank-arms having loose engagement with the said beams, an operator's lever having a link connection with the intermediate crank, and locking means for said lever.

In testimony whereof I affix my signature in presence of two witnesses.

ANDREW J. SUTTON.

Witnesses:
 E. N. CONNAL,
 W. F. McCORMICK.